No. 630,597. Patented Aug. 8, 1899.
H. DAUT.
APPARATUS FOR GENERATING ACETYLENE GAS.
(Application filed Mar. 2, 1898.)
(No Model.)
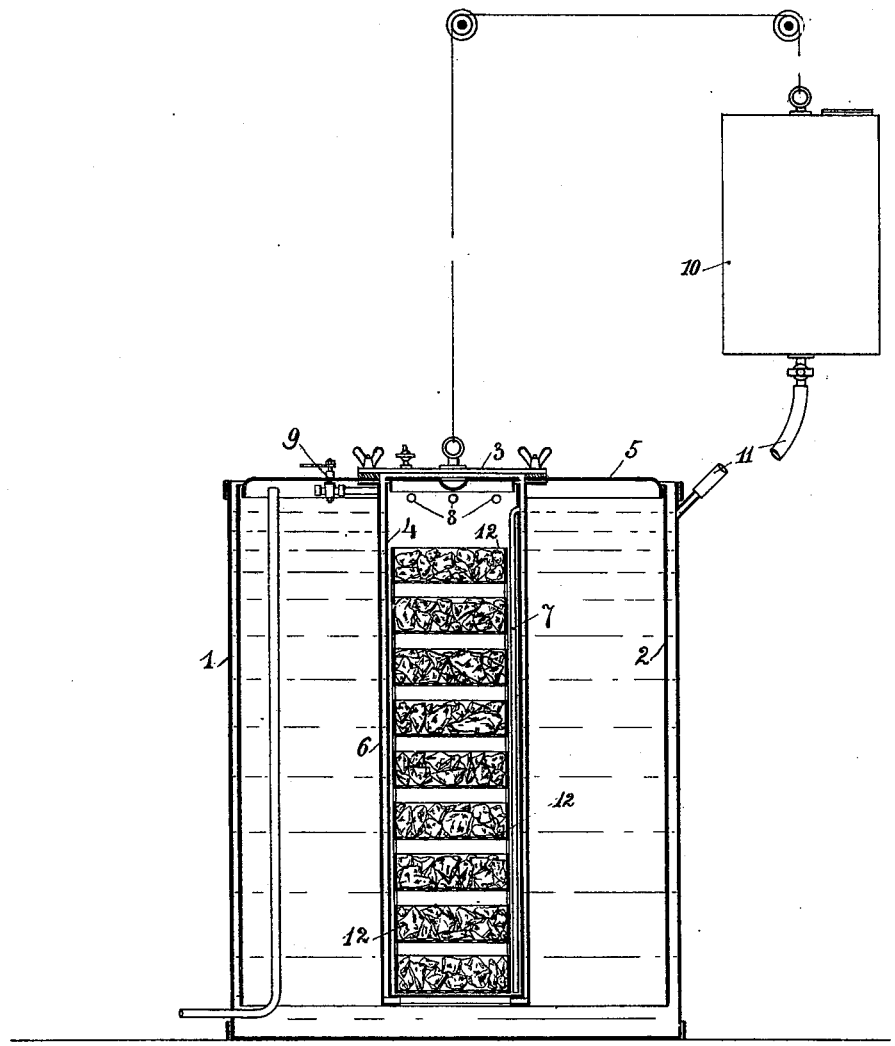
Witnesses:
alex Wiele
Max Scheidig
Inventor:
Heinrich Daut
by B Singer
atty.

UNITED STATES PATENT OFFICE.

HEINRICH DAUT, OF NUREMBERG, GERMANY.

APPARATUS FOR GENERATING ACETYLENE GAS.

SPECIFICATION forming part of Letters Patent No. 630,597, dated August 8, 1899.

Application filed March 2, 1898. Serial No. 672,315. (No model.)

*To all whom it may concern:*

Be it known that I, HEINRICH DAUT, filter, a subject of the King of Bavaria and the German Emperor, residing at Solgerstrasse 6, Nuremberg, Bavaria, Germany, have invented certain new and useful Improvements in Apparatus for the Development and Collection of Acetylene Gas; and I do hereby declare the following to be a full, clear, and exact description of the invention, such as will enable others skilled in the art to which it appertains to make and use the same.

The apparatus hitherto in use for the development of acetylene gas was cumbered more or less with contrivances for admitting and closing the water to the carbid of calcium. The present apparatus is constructed so as to regulate the development of the gas by the rise and fall of the reservoir without any valve or similar means. This is effected by hanging the vessel containing the carbid in the reservoir itself, and both of these dip in the water. At the same time a tube with its mouth rising or falling above or below the surface of the water brings the due quantity of water to the carbid according to the amount being consumed.

The accompanying drawing shows the apparatus in upright section.

The reservoir 2, swimming in the cistern 1, has above a removable cap 3, below which the carbid vessel 4 hangs to a support 6 in the reservoir-cap 5. The carbid vessel 4 is divided in several cells of perforated and removable drums standing over each other at certain distances. Of these first the lowest receives water from the pipe 7, which by deepest position of the reservoir dips with its mouth under the surface of the water. By this form of apparatus an overproduction of gas is impossible, contrary to what takes place when the water is introduced from above on the whole quantity of carbid, as one cell at most of the dry carbid can be put under water in this way and the development of gas by the further entrance of water can by the rising of the mouth of the tube above the surface of the water not be greater than the reservoir can contain. The gas ascends through the cells, escapes by the openings 8 from the cistern, and fills the reservoir by the cock 9, worked from above, and which is shut when the carbid has to be renewed. The renewal of the water taken from the cistern 1 for developing the gas is made from the air-tight vessel 10, which serves to balance the gas-reservoir, so that in this way, proportional to the consumption of carbid, and consequently to the diminution of the weight of reservoir, the overbalance becomes less, and therefore equal pressure of gas must be present. From the vessel 10 a rubber tube 11 enters the cistern 1 through a support.

Before taking out the carbid-reservoir the gas contained in the same is removed by burning through the burner on the cap 3.

Having now fully described my invention, what I claim as new, and desire to secure by Letters Patent, is—

1. In an acetylene-gas apparatus, the combination with a water-tank, of a gasometer suspended in said tank, a closed carbid vessel suspended in said gasometer, a pipe connecting the water-tank with the bottom of the closed carbid vessel, a water-supply tank, a pipe connection between this and the first-named tank, and a suitable connection between the closed carbid vessel and the water-supply tank whereby they counterbalance each other, substantially in the manner and for the purpose set forth.

2. In an acetylene-gas apparatus, the combination with a water-tank, of a gasometer suspended in said tank, a closed carbid vessel suspended in said gasometer, a plurality of carbid-baskets removably secured in said receptacle, a pipe connecting the water-tank with the bottom of the closed carbid vessel, a water-supply tank, a pipe connection between this and the first-named tank, a suitable connection between the closed carbid vessel and the water-supply tank whereby they counterbalance each other, and a closure for the closed carbid vessel provided with a burner, all substantially as set forth.

In testimony that I claim the foregoing as my invention I have signed my name in presence of two subscribing witnesses.

HEINRICH DAUT.

Witnesses:
ALEX WIELE,
MAX SCHEIDIG.